(12) United States Patent
Stemmle et al.

(10) Patent No.: US 7,440,148 B2
(45) Date of Patent: Oct. 21, 2008

(54) SYSTEM FOR MANIPULATING PAGES OF A MATERIAL

(75) Inventors: Denis J. Stemmle, Stratford, CT (US); Cornelius S McNab, New Haven, CT (US); Darryl T Rathbun, Stratford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1183 days.

(21) Appl. No.: 10/206,609

(22) Filed: Jul. 26, 2002

(65) Prior Publication Data

US 2004/0027547 A1 Feb. 12, 2004

(51) Int. Cl.
*H04N 1/04* (2006.01)

(52) U.S. Cl. .................. 358/474; 358/498; 358/494; 355/25; 399/362; 271/167

(58) Field of Classification Search ................. 358/474, 358/498, 449; 355/25, 230; 399/362, 86; 271/104, 167, 123; 84/486
See application file for complete search history.

(56) References Cited

U.S. PATENT DOCUMENTS

| | | | | |
|---|---|---|---|---|
| 4,693,594 A | 9/1987 | Garavuso et al. | ............... | 355/25 |
| 4,942,482 A | 7/1990 | Kakinuma et al. | ........... | 358/474 |
| 5,062,602 A * | 11/1991 | Kress et al. | ................. | 271/104 |
| 5,084,732 A | 1/1992 | Tsaur et al. | ................. | 355/230 |
| 5,286,956 A | 2/1994 | Mochizuki | ................. | 235/432 |
| 5,325,213 A | 6/1994 | Takahashi et al. | ........... | 358/474 |
| 5,390,033 A | 2/1995 | Bannai et al. | ............... | 358/498 |
| 5,471,277 A | 11/1995 | Fujioka et al. | ................. | 355/25 |
| 5,572,284 A | 11/1996 | Fujioka | ....................... | 299/362 |
| 5,575,097 A | 11/1996 | Chou et al. | ................... | 40/531 |
| 5,583,607 A | 12/1996 | Fujioka et al. | ................. | 355/25 |
| 5,583,662 A | 12/1996 | Takahashi et al. | ........... | 358/474 |
| 5,610,720 A | 3/1997 | Fujioka et al. | ............. | 358/296 |
| 5,798,841 A * | 8/1998 | Takahashi | ................... | 358/296 |
| 5,854,670 A | 12/1998 | Yong | ............................ | 355/25 |
| 5,962,801 A | 10/1999 | Bowman et al. | ............. | 84/486 |
| 6,049,033 A | 4/2000 | Dallas | ......................... | 84/486 |
| 6,055,036 A | 4/2000 | Takahashi | ..................... | 355/25 |
| 6,075,624 A | 6/2000 | Bannai et al. | ............... | 358/498 |
| 6,103,963 A | 8/2000 | Nakamura et al. | ........... | 84/486 |
| 6,281,990 B1 | 8/2001 | Takahashi | ................... | 358/474 |
| 6,574,014 B2 * | 6/2003 | Mandel et al. | ............... | 358/474 |
| 6,611,362 B2 * | 8/2003 | Mandel et al. | ............... | 358/474 |
| 6,762,356 B2 * | 7/2004 | McNab et al. | ................ | 84/486 |
| 2003/0063335 A1 * | 4/2003 | Mandel et al. | ............... | 358/498 |

* cited by examiner

*Primary Examiner*—Edward L. Coles
*Assistant Examiner*—Negussie Worku
(74) *Attorney, Agent, or Firm*—Christopher H. Kirkman; Steven J. Shapiro; Angelo N. Chaclas

(57) ABSTRACT

The present invention relates to turning and recording and/or reproducing multiple pages or leaves from a material, such as a book or periodical. A leaf lifting mechanism lifts the leaves of the material (e.g., book, periodical, etc.) from which the images are to be obtained. The leaf lifting mechanism can turn the leaves of the material itself, or also work cooperatively with an image recordation mechanism to turn the leaves of the material. During recordation, the image recordation mechanism follows the curvature of the leaf being recorded to minimize image distortion or degradation. The recorded images may be reproduced by a reproduction device such as a photocopier or printer.

31 Claims, 8 Drawing Sheets

SYSTEM FOR MANIPULATING PAGES OF A MATERIAL

BACKGROUND

1. Field of the Invention

The present invention relates generally to manipulating pages of a material. This includes turning pages of a material and also obtaining data from the material. More particularly, the invention relates to a method and apparatus that enables the pages or leaves of the material to be turned so that the data thereon may be recorded by a data obtaining mechanism with minimal image distortion and degradation.

2. Brief Description of the Art

Photocopying multiple pages from materials, such as, for example, reference books, newspapers, periodicals, pamphlets and magazines, is a difficult and cumbersome process. Conventional photocopying machines are designed to copy flat materials. Present methods of photocopying pages from a material such as a book, involve placing the open book facedown on the glass platen surface of a photocopier or scanning device, pressing down on the spine of the book, pressing the Print/Copy button to scan and/or photocopy, and waiting a few seconds for the page to be reproduced.

One conventional approach is disclosed in U.S. Pat. No. 5,286,956, entitled, "Printer Having Page-Turning Apparatus For Passbooks And With Page-Turning Capability Even After Initial Deformation Of Sheets To Be Turned", issued Feb. 15, 1994 to Mochizuki. This patent relates to a printer for passbooks or the like, which is brought in on a transfer path, is stopped at the position of a page-turning roller, where a sheet is turned over by the operation of the page-turning roller. When a sheet is turned over by the page-turning roller, at a position separate from a start position of turning over of a sheet, the passbook undergoes an initial deformation in a out-of-plane direction so that the passbook is bent in a first-order mode. By this initial deformation, a sheet can be turned over steadily. Such a turnover of the sheet can be effected in conjunction with utilizing an optical system which provides an image of the three-dimensional deformation pattern of the passbook which is processed. In accordance with this pattern a decision is made whether or not the out-of-plane deformation of the passbook is more than a specified amount. In the vicinity of the transfer path there is also provided a push guide that gives a deformation to the passbook when a sheet is turned over. Based on a frictional control of the page-turning operation, a steady turnover of the sheet can be affected regardless of buckling resistance force of the sheet to be turned over.

One disadvantage to that approach is that it fails to obtain data from the passbook; but merely prints additional information on a page of the passbook.

Another conventional approach is disclosed in U.S. Pat. No. 4,693,594, entitled, "Platen Transport And Vacuum Plenum For Book Copying" issued Sep. 15, 1987 to Garavuso et al. This patent relates to an arrangement for transporting a book facedown onto and off of a copier that includes a platen transport and a belt transport positioned on opposite sides of a vacuum plenum that is used to peel the bottommost page from a book to turn the same as the book is moved back and forth between the transport platen and belt member. As the book moves the vacuum plenum by a predetermined amount, it contacts a roller and is supported on the roller as it is transported onto and off of the platen by the platen transport. The roller reduces the friction between the pages of the book and the platen.

One disadvantage to that approach is that it requires the book to be moved, which can cause damage to the book.

One disadvantage to another conventional approach is that the book or material to be photocopied must be lifted, the page turned manually, and the process repeated for each page that is to be photocopied. This allows the copying of one or two pages at a time, depending on the size of the book relative to the photocopying surface. Thus, the photocopying process is cumbersome when photocopying numerous pages from a material, especially when performing research that requires photocopying a large number of pages from periodicals, because typically periodicals are not allowed to be checked out of a library.

Another disadvantage to the conventional photocopying approach is that it often results in damage to the material from repeated manipulation and handling, and the pressure placed on the spine of the material during the photocopying process.

Yet another disadvantage to the conventional approach is that it may result in distorted photocopies when the material to be copied is not pressed firmly against the platen.

Yet another disadvantage to the conventional approach is that it is very tiresome, inefficient, and time-consuming.

What is needed to overcome drawbacks in the state of the art is a method and apparatus for efficiently turning pages of a material to permit recording and reproducing distortion-free images from the material without damaging the material.

BRIEF SUMMARY OF THE INVENTION

The instant invention provides a solution to the above-noted problems by providing a method and apparatus that records and reproduces multiple pages or leaves from the material with minimal image distortion and degradation.

The method and apparatus of the present invention may be used in a stand-alone fashion or, alternatively, may be built as an attachment to conventional photocopiers, printers, facsimiles, or other machine that is capable of recording, reproducing, transmitting, or storing printed data.

Accordingly, one embodiment of the present invention is directed to an apparatus for turning leaves of a material such as a book that has a plurality of leaves or pages. The apparatus includes a leaf moving mechanism that turns a leaf by moving the leaf in a transverse direction. A leaf moving frame supports the leaf moving mechanism, and a motor unit moves the leaf moving frame from a first position to a second position where the first position is different from the second position. Optionally, a data-obtaining unit records data from an exposed leaf or pair of leaves of the material.

Another embodiment of the present invention is directed to an apparatus to turn leaves of a material such that data is obtained from an exposed leaf or pair of leaves. The apparatus includes a leaf moving mechanism that lifts and turns a leaf. A support frame supports a leaf acquisition mechanism. A plurality of support members connect the leaf acquisition mechanism to the support frame. A data obtaining unit is used to obtain data from an exposed leaf. The apparatus also includes, a wheel unit, a leaf tensioning mechanism, and a medium for displaying the obtained data.

Yet another embodiment is directed to a data-obtaining unit that is positioned so as to turn pages of a material such as a book or pamphlet and obtain image data or text data from the material.

In this respect it is to be understood that the invention as described herein is not limited in its application to the details of construction and to the arrangements of the components set forth in the following description or illustrated in the drawings. Methods and apparatus consistent with the present invention are capable of other embodiments and of being practiced and carried out in various ways. Also, it is to be understood that the phraseology and terminology employed herein, are for the purpose of description and should not be regarded as limiting.

DETAILED DESCRIPTION OF THE INVENTION

Methods and apparatus consistent with the present invention relate to turning, recording, and reproducing pages or leaves from a material, such as a book, periodical, pamphlet, newspaper, or bound material.

The instant invention has various embodiments. In one embodiment, pages are turned by a leaf or page turning sheet affixed to a corresponding support member. Each sheet flips or turns a page of material to enable image data (also referred to herein as images or data) on the page to be exposed. This data can be viewed by a person looking at the text or acquired by a data-obtaining unit. The data-obtaining unit may be a fixed CCD scanner, or an optical device or the like. A typical data obtaining unit is a photocopier.

Alternatively, a pair of leaf turning sheets may be used to turn a single page. This may be achieved by either placing two leaf turning sheets so as to envelope the page or to use one leaf to turn a sheet while a second leaf secures the material.

Alternatively, in another embodiment, the data-obtaining unit may be a movable image sensor that traverses the page thereby acquiring data from the page.

In another embodiment, pages are turned by a page turning mechanism such as a vacuum or tacky roller that rolls over, lifts and turns (flips) pages of a material, thereby exposing pages of the material.

The vacuum or tacky roller mechanism may be used with a fixed data-obtaining unit or may be used in conjunction with a data-obtaining unit that is a movable image sensor, such as a contact image sensor, that traverses the page thereby acquiring data from the page. Also, the data-obtaining unit may function to turn the leaves or pages and obtain data from the leaves or pages.

Figure 1A:
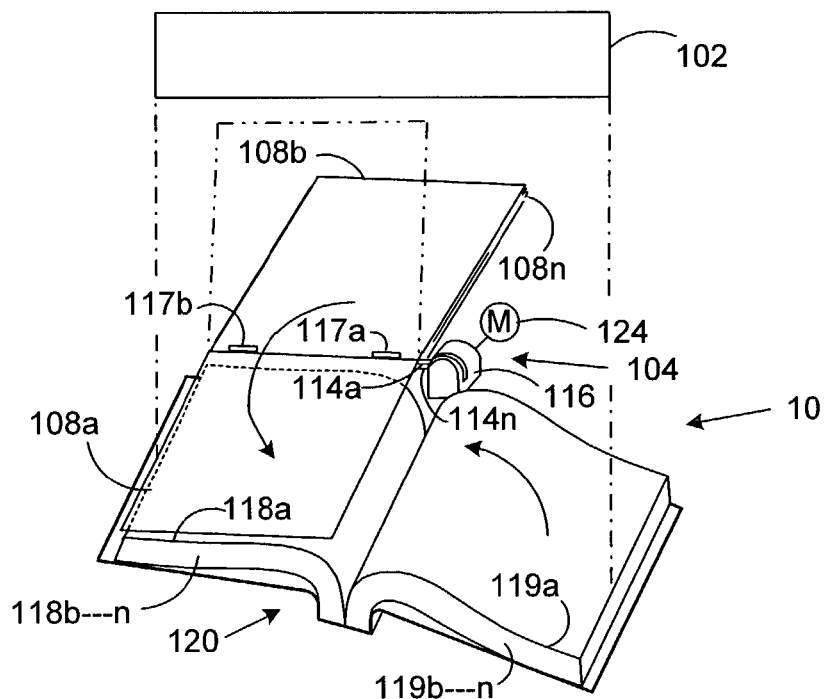
FIGS. 1A, 1B, and 1C show a leaf turning apparatus according to one embodiment of the present invention.
Figure 1B:
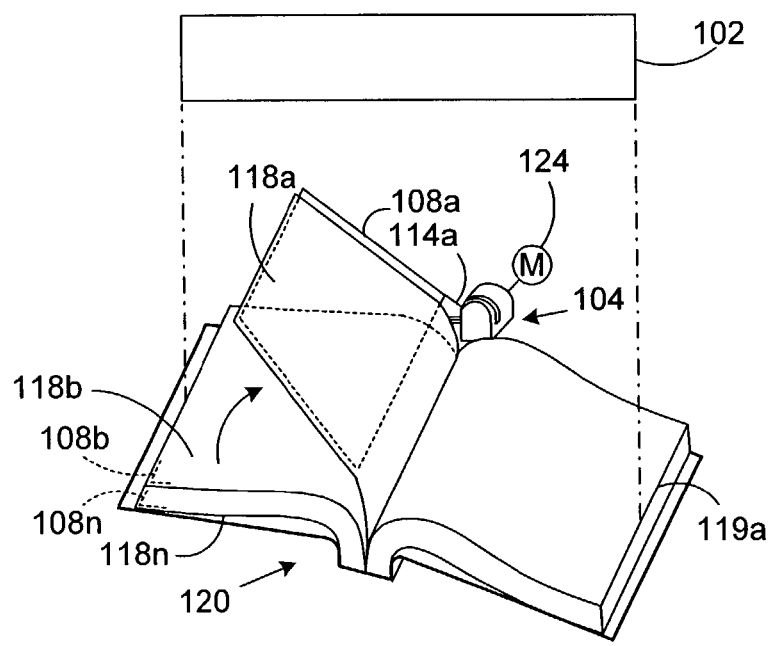
Figure 1C:
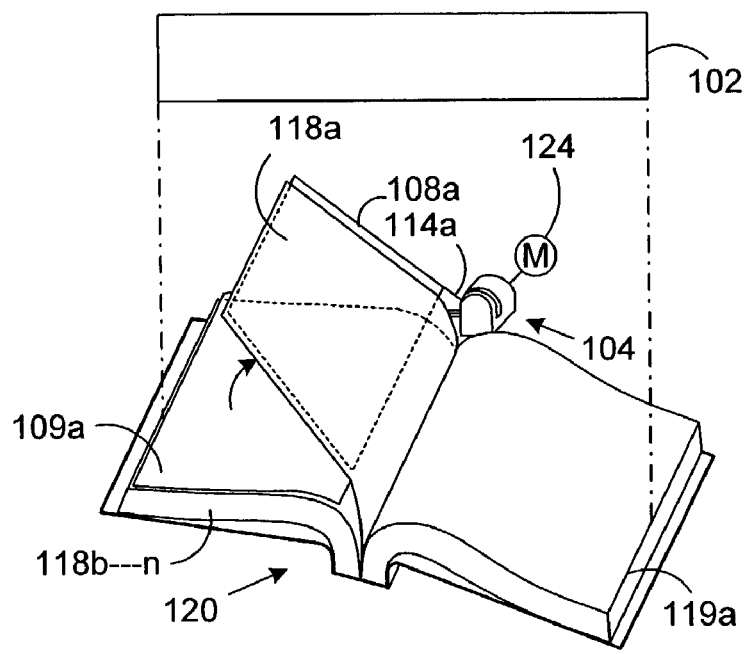

FIGS. 1A, 1B and 1C show an embodiment of an apparatus to turn leaves of a bound volume to expose data thereon. A data-obtaining unit is shown in conjunction with the leaf, or page, turning apparatus.

As shown in FIG. 1A, system 10 includes a leaf moving mechanism 104 that is used to turn or flip pages or leaves containing data.

The leaf moving mechanism 104 includes a plurality of leaf turning members 108(a) . . . (n) where (n) is any suitable number. Each leaf or sheet or page turning member 108(a) . . . (n) has a corresponding support member 114(a) . . . (n), where (n) is any suitable number. The leaf turning members, generally 108, are preferably made of a transparent lightweight flexible thin plastic or metal, or transparent metal material, which have sufficient strength and dimensions to move any leaves 118, 119 of the material 120 without difficulty, no matter the dimensions or composition of the leaves 118, 119 of the material 120. As described herein, leaves 118(a) . . . (n) (where n is any suitable number) are pages of the material 120 and include text and/or image data. Leaves 118 are positioned on a left-hand side of a material 120 and leaves 119(a) . . . (n) (where n is any suitable number) are pages of the material that are positioned on a right hand side of a material 120. Of course, the status of leaves 118 and 119 is a function of where the material 120 is opened, and the designation of leaves 118 and 119 is used for descriptive purposes to describe how the pages of material are turned.

Preferably, leaf turning members 108 may be, for example, transparent plastic discs, or oval plates that are approximately between 1 and 12 inches long, or transparent plastic sheets with dimensions of approximately 8½"×11". Each support member, generally 114, is coupled to a corresponding leaf turning member 108 and a pivoting mechanism 116 that pivots the support member 114 to enable the leaf turning members 108 to turn leaves 118(a) . . . (n). This rotation is typically approximately one hundred and eighty degrees (180°) in a first direction. . Prior to turning a page, the leaf turning member 108 is positioned in the book or material by inserting the leaf turning member 108 between selected pages. A proximal portion of the support member 114 is connected to a motor 124.

The motor or drive unit 124 is typically an A.C. or D.C. motor, or other suitable moving mechanism, that enables the support members 114 to move the pages 118, 119 of the material 120. The specific design requirements are a function of the intended application and are readily apparent to those skilled in the art. Support members 114 are connected to motor 124 such that the support members 114 are able to move sheet members 108 to turn or flip leaves 118of material 120. The system typically includes a controller microprocessor (not shown) that is programmed to control the motor 124. A conveyor belt or drive belt type mechanism (not shown) may be used in conjunction with the motor 124 and support member 114 to move the support member 114 and turn the associated page.

Prior to a start of the page turning operation, a user positions the material 120, such as the book, magazine, newspaper, periodical, or multi-page document so that the data-obtaining unit 102 can obtain data from at least one of the leaves 118(a) . . . (n) and/or 119(a) . . . (n). The image data that is to be obtained is typically upwardly facing when the data-obtaining unit 102 is disposed above the surface supporting the material 120 to be recorded such as for example, a table or platform (not shown). However, the material 120 may be positioned as required so that the data can be acquired by the data-obtaining unit 102. The user then manually pivots downward each leaf or sheet member 108(a), 108(b), etc. of the leaf turning mechanism 104, from a non-inserted position to an inserted position. For example, the user inserts sheet member 108(a) beneath page 119(a), sheet member 108(b) beneath page 119(b) and so forth for the number of pages the user wishes to turn, scan, photocopy, or otherwise view or obtain data from.

Alternatively, the material 120 may be positioned with the pages facing downward. In this embodiment, the sheet members 108 are inserted between the downward facing sheets and the cover of the book is supported, for example by a shelf. Yet another embodiment is that the material is positioned so as to be supported by the binding. The sheet members 108 are positioned so as to turn the pages.

The data-obtaining unit 102 may be a scanner, camera, or other means for obtaining data. The data obtained by the data-obtaining unit 102 may be reproduced, for example, by an image storage recordation/reproduction device (not shown) such as a computer, photocopier, printer, facsimile device, or may be digitally recorded by the data-obtaining unit 102 for electronic storage or transmission or reproduction on film or paper or conversion to another format (such as optical character recognition or voice synthesis of text).

Alternatively, sheet members 108(*a*), 108(*b*) etc. may be manually inserted by the user under each of the leaves 118(*a*), 118(*b*) etc. of the material 120 to be turned during the recordation operation. For example, sheet members 108(*a*) may be placed under upward-facing leaf 118(*a*), which is the first to be recorded, stored and/or reproduced, and sheet members 108(*b*) . . . (*n*) may be placed under all other leaves below e.g. 118(*b*) . . . (*n*), which are to be turned. In this embodiment viewing and/or obtaining data (recordation, storage and/or reproduction) from the leaves 118(*a*) . . . (*n*) occurs in reverse order (i.e., last page to first page).

In an embodiment in which the page turning apparatus of the present invention has an integrated photocopier, the user may select the number of pages to be turned and recorded. When the desired number of leaf turning members, or sheet members 108(*a*) . . . (*n*) have been properly disposed relative to leaves 118 and/or 119, which have been identified for recordation, the user typically initiates the recordation or acquisition process by activating the data-obtaining unit 102 by, for example, pressing the "Start" button, and the recordation operation begins. The data-obtaining unit 102 then proceeds to acquire the data (i.e., scanning, photographing and other known data acquisition techniques) from the exposed upwardly-facing leaves 118, 119 of the material 120 for immediate or later reproduction on paper, storage to an electronic medium such as RAM, ROM, or electronic transmission over a network, communication line or other transmission medium or conversion to another format (such as optical character recognition or voice synthesis of text).

As shown in FIG. 1A, a pair of rollers 117(*a*) and 117(*b*) are mounted on a corresponding sheet member 108. The roller 117 is used to facilitate movement of the sheet member over surfaces 118, 119. Alternatively, attachment rings may be used to facilitate the movement.

As shown in FIG. 1B, once recordation or acquisition of the data on the upwardly-facing leaves 118(*a*), 119(*a*) has been performed, the motor 124 moves the support member, 114(*a*) of the uppermost sheet member 108(*a*) disposed under leaf 118(*a*) in the second direction (i.e., flipped approximately 180° from left to right as shown in FIG. 1B) such that leaf 118(*a*) is flipped, or turned over, onto leaf 119(*a*), exposing new leaves 118(*b*) to be recorded. The leaf member 108(*a*) that is flipped over holds the turned leaf flat, so that recordation of the newly upwardly facing leaves is conducted by the data-obtaining unit 102. The leaves 118(*b*) . . . (*n*) of the material 120 are turned by the leaf turning members 108(*b*) . . . (*n*), which are moved via motor 124 of the leaf moving mechanism 104 until all the leaves 118(*b*) . . . (*n*) which have been designated by placement of leaf turning members 108 have been turned and the data thereon recorded and/or acquired.

It is apparent that the size of the transparent sheet members 108 can vary, from for example 8½×11 inches, to a somewhat smaller size, as long as the transparent leaves are sufficient in size and strength to turn the leaves 118, 119 of the material 120.

FIG. 1C shows an alternate embodiment in which each sheet member includes a plurality of leaf pairs 108(*a*) . . . (*n*) and 109(*a*) . . . (*n*) (where n is any number) that can be used such that a lead leaf 108(*a*) turns a page and a following leaf 109(*a*) holds the material in position while data is obtained. The embodiment shown in FIG. 1C is also suitably used in conjunction with a data-obtaining unit 102. Although FIG. 1C only shows one pair, 108(*a*), 109(*a*), additional pairs may also be used. Thus, this embodiment shows that two leaves 108(*a*) and 109(*a*) may be used to turn a single page 118(*a*) and to hold the material 120 in position. Other elements described in relation to FIG. 1A and FIG. 1B are shown but not described.

Figure 2:
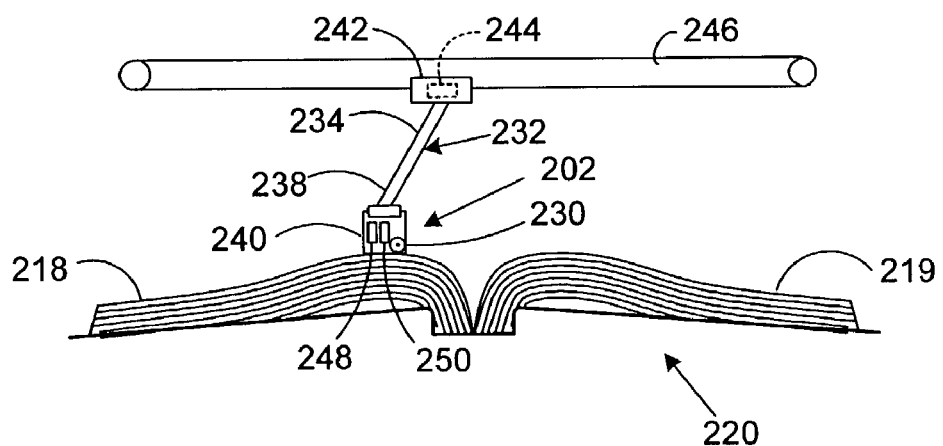
FIG. 2 shows a data obtaining unit used with the present invention.
Figure 4:
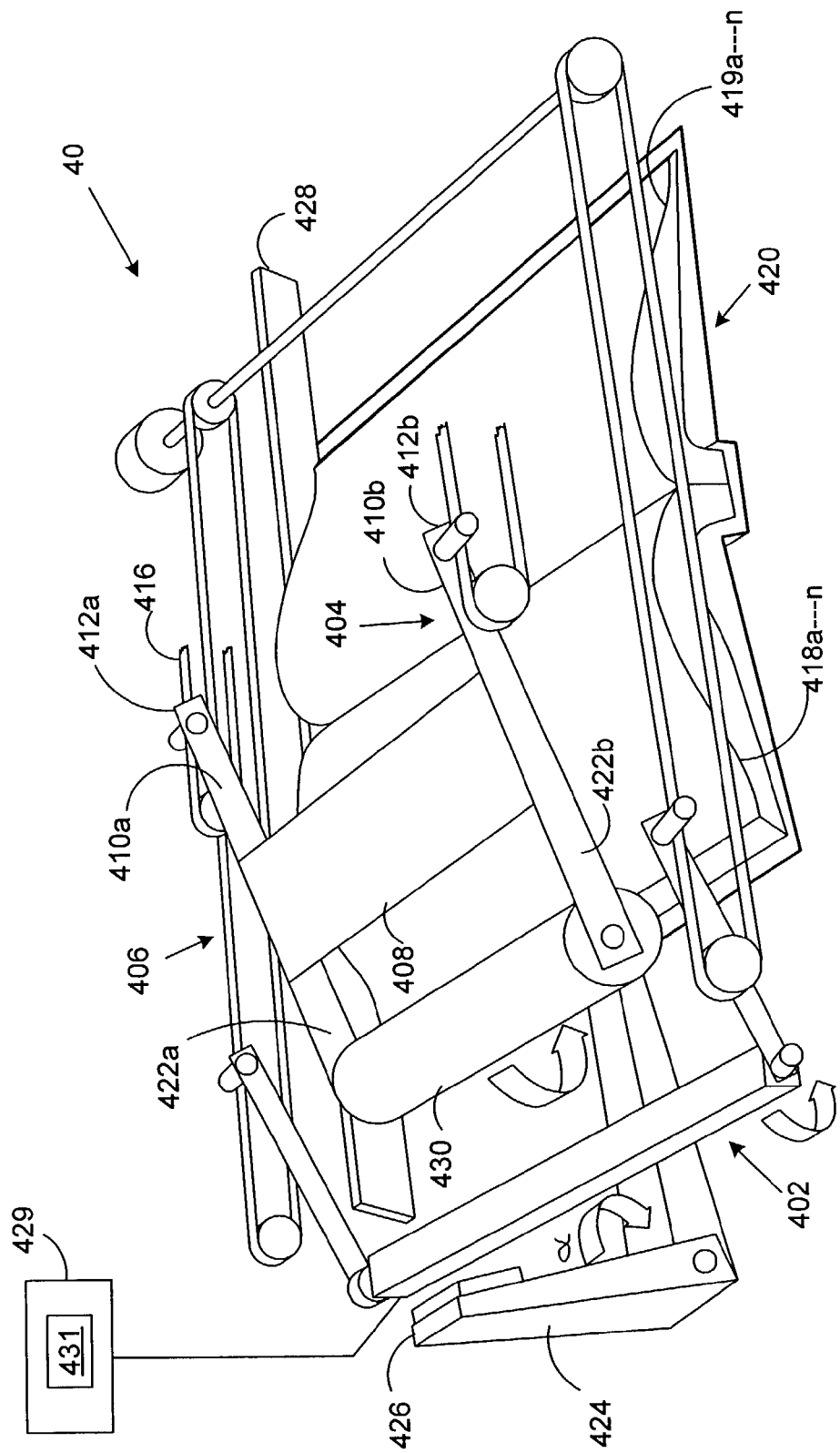
FIG. 4 shows a leaf turning apparatus according to a second embodiment of the present invention.

FIG. 2 shows a data-obtaining unit 202 that may be used in conjunction with a leaf turning mechanism (described above as element 104). The movable data-obtaining unit 202 obtains data from leaves 218, 219 of material 220. Movable data-obtaining unit 202 may be coupled to a data storage unit or data reproduction unit, such as a photocopier, printer, computer or facsimile machine (not shown). The movable data-obtaining unit 202 is adapted to reduce distortion, foreshortening, and image degradation of the data obtained from material 220 since it follows the contour of the material. The movable data-obtaining unit 202 includes a pivotable image sensor 240 supported by at least one, but typically a pair of supporting arms. (FIG. 2 shows a single arm 232, and FIG. 4 shows two arms). The supporting arm 232 has proximal portion 234 and distal portion 238. Distal portion 238 of the supporting arm 232 includes the image sensor 240. The first support mechanism 246 is coupled to a lift and lowering mechanism 242 having a pivoting mechanism 244 that pivots the supporting arm 232, such that the arm 232 lifts the image sensor 240 from the leaves 218, 219 of the material 220 after recordation, and which lowers the image sensor 240 onto the leaves 218, 219 of the material 220 for recordation. The pivoting mechanism 244 of the lift and lowering mechanism 242 is disposed on a carriage transport drive 246.

The carriage transport drive 246 is coupled to a motor (not shown), and is used to facilitate the movement of image sensor 202 through a desired path of motion. The motor may be coupled to a microprocessor that is programmed with logic control to control the motor.

The image sensor 240 may include a photodetector, an alignment of rasterizer chips, a rod lens (e.g., a SELFOC™ lens), and a plurality of light-emitting diodes (LED's). Disposed at one end of the image sensor 240 is an encoder wheel 250 and a sensor 248 attached to a roller 230, which may be an elastomeric roller. The roller 230 contacts the material 220 and the encoder wheel 250 and sensor 248 tracks a distance traveled by the image sensor 240 on the material 220, in order to trigger recording by the image sensor 240 at a designated displacement (e.g., a particular number of scan lines per inch for an appropriate resolution of the data that is being obtained).

The image sensor 240 can vary in length, but for the highest efficiency, in order to prevent multiple passes over each leaf 218, 219, the image sensor 240 is approximately at least the height of each of the leaves of the material 220 such that scanning of the leaves 218, 219 can be performed during one scanning pass.

Thus, the movable data-obtaining unit 202 may be used in conjunction with the leaf moving mechanism, described above, to obtain data from pages, as pages are turned. The leaf turning motor described as element 124 in relation to FIGS. 1A and 1B is typically coordinated with the data-obtaining motor so that as the pages are turned, the data is obtained from the pages.

Although FIGS. 1A, 1B, and 1C show the leaf turning mechanism 104 of the present invention being used with a self-contained data-obtaining unit 102, and FIG. 2 shows a movable data-obtaining unit 202 for the recordation of data from the material 220, the leaf turning mechanism 104 as described herein may also be used without a data-obtaining unit to turn the leaves 118,119 of a material 120 for any reason where remote turning of the leaves is required (e.g., for handicapped users or for turning sheet music for a pianist). In that case, the sheet members 108(*a*) . . . (*n*), or in the case of the embodiment using a plurality of leaf pairs108, 109, the leaf members are inserted under leaves that the user wishes the leaf turning mechanism 104 to turn.

FIGS. 3A-3G show a lift and lowering process of a movable data-obtaining unit 302 in which the data-obtaining unit obtains data that may be reproduced, stored, transmitted or photocopied. Upon initiation of the recordation operation, the lift and lowering mechanism 342 lowers or pivots the supporting arms 332 of the data-obtaining unit 302 from a rest position 370. The lift and lowering mechanism 342 is coupled to a carriage transport drive 346. As shown in FIGS. 3A-3G the carriage transport drive 346 moves the data-obtaining unit, also referred to as an image sensor 302, across upwardly facing leaves 318, 319 to capture image and or text data printed on leaves 318, 319.

Figure 3A:
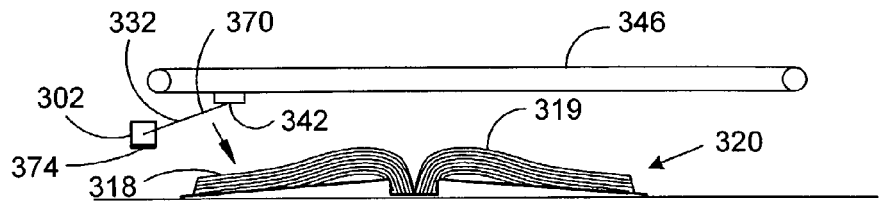
FIGS. 3A-3G show a movable data-obtaining unit.

FIG. 3A shows that support arm 332, moves from a rest position 370 to a position where the image sensor is in contact or slightly above the text/image data to be acquired. Carriage transport drive 346, lift and lowering mechanism 342 and material 320 are also shown.

Figure 3B:
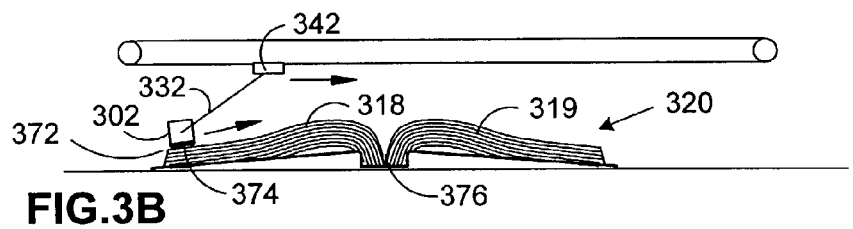

FIG. 3B shows that the image sensor 302 is placed at an initial position 372 on the first leaf 318 of the two upwardly facing leaves 318, 319 of the material 320. The initial position 372 is where the image sensor 302 is in direct contact with the first upwardly facing leaf 318 of the material 320 to be recorded, at a left side of the material 320, and at an outer edge thereof. The image sensor 302 is pivotable with respect to the supporting arm 332, such that the image sensor 302 is placed in essentially flat contact with the leaf 318 of the material 320. The data obtaining operation begins when the image sensor 302 begins moving to the right across leaf 318, with the encoder wheel and sensor, (described in relation to FIG. 2) triggering data obtaining at each completion of incremental traversal of a designated distance. Obtaining the data on leaf 318 ensues, with the image sensor 302 following the contours of the material 320.

During data acquisition, the image sensor 302 pivots and rotates freely with respect to the supporting arm 332 such that an imaging facet 374 of the image sensor 302 follows the contour of the leaf 318 (which typically begins at an incline and then curves downwardly near the spine, fold, or bound edge 376), and remains in essentially flat or tangential contact with the upwardly-facing leaves 318, 319 of the material 320. Thus, the encoding wheel remains in contact with the surface of the leaf being imaged 318, 319 and it sends signals to the logic circuit (not shown) to trigger the mastering of data from the image sensor 302 as a function of the curvilinear distance moved across the curved surface of the leaf 318. This reduces distortion of the images near the spine 376 of the material 320 since the rastering of data is based on an incremental distance along the curved leaves 318, 319 rather than the traditional linear intervals in a plane approximating the surface of material 320.

Figure 3C:
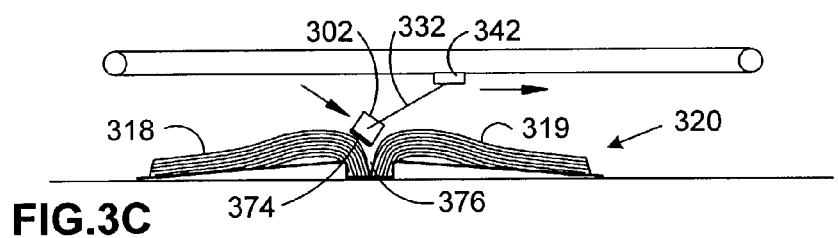

As shown in FIG. 3C, when the image sensor 302 has completed recordation of data on the first leaf 318, and reaches a position near the spine 376 of the material 320, the image sensor 302 has experienced some rotation.

Figure 3D:
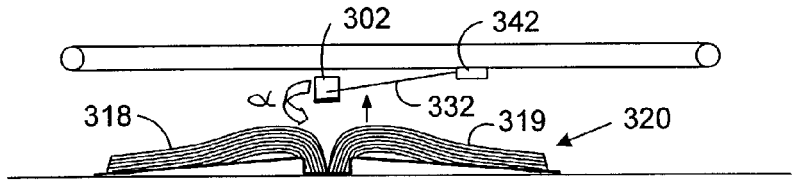

As shown in FIG. 3D, while between the two leaves 318 and 319, the left to right recordation or scanning motion of the image sensor 302 is temporarily halted while the lift and lowering mechanism 342 raises the supporting arms 332 and lifts the image sensor 302 out of contact with the surface of leaf 318. The image sensor, once out of contact with the leaf 318, resumes an orientation with its imaging facet 374 parallel to the support surface of the material; the image sensor is rotated by the angle a to compensate for the rotation shown in FIG. 3C.

Figure 3E:
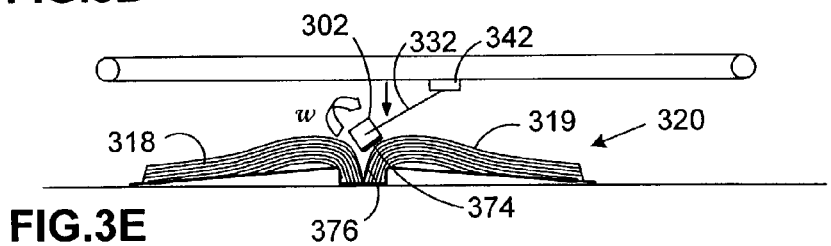
Figure 3F:
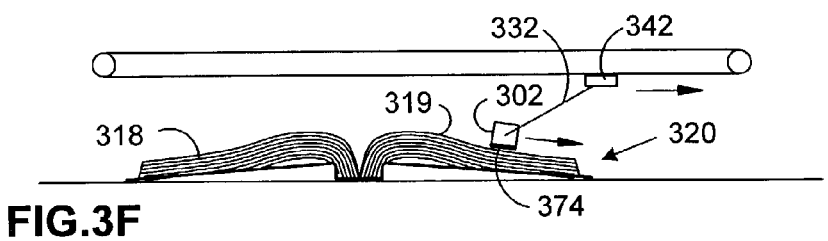

As shown in FIGS. 3E and 3F, the lift and lowering mechanism 342 lowers the supporting arm 332 onto the leaf 319 near the spine 376. The image sensor is rotated such that its image facet 374 becomes tangential to the curved surface of the leaf 319. The imaging facet 374 of the image sensor 302 makes contact with the leaf 319 of the material 320 and acquisition of data on leaf 319 continues. As discussed above, the image sensor 302 is pivotable such that it remains in tangential contact and conforms to the contour of leaf 319. As stated above, the encoder wheel and the image sensor 302 which are in flat contact with the leaves of the material 320 allow acquisition of the data to be performed without substantial distortion, foreshortening, or degradation of the data.

Figure 3G:
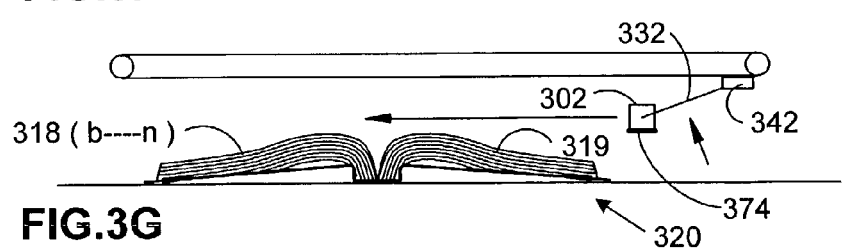

As shown in FIG. 3G, when the encoder wheel and sensor has detected that there is no more data, or when the carriage transport drive has reached the end of its path, the image sensor 302 is lifted by the lift and lowering mechanism 342 and returned to the rest position 370 above material 320 (shown in FIG. 3A). If the data of additional leaves 318(*b*) . . . (*n*) are to be obtained, the data obtaining operation is repeated until all the leaves identified are complete. Reproduction of the data can take place immediately or at a later time depending on the reproduction device used (e.g., photocopier, camera system etc.). The data may also be stored electronically such as in computer memory, server location, facsimile memory or transmitted electronically to a remote location.

FIG. 4 shows an embodiment 40 of the invention in which the leaf moving mechanism 404 includes a leaf acquisition mechanism 406 and a movable data-obtaining unit 402.

The leaf acquisition mechanism 406 includes a support mechanism 408 having at least one, but preferably a pair of supporting arms 410(*a*) and 410(*b*) generally 410. The supporting arms 410(*a*) and 410(*b*) have proximal portions 412(*a*) and 412(*b*), respectively, which are pivotably attached to a carrier transport drive 416. Supporting arms 410(*a*) and 410(*b*) have distal portions 422(*a*) and 422(*b*), respectively, which are coupled to a leaf turning mechanism 430. The leaf turning mechanism 430 is, for example, a vacuum roller. Alternatively, the leaf turning mechanism 430 can temporarily adhere the leaves 418, 419. For example in this situation, the leaf turning mechanism 430 is suitably a roller with an adhesive tape or a static electric charge. Other examples include tabs or hooks (not shown) that attach to the page or leaf to be turned. A motor (not shown) may be used to move the roller and frame so that the leaf or page is lifted and thereby flipped. The motor may be coupled to the microprocessor 429 such that the microprocessor 429 controls the motor so that the leaf turning mechanism 430 functions in a desired manner.

A leaf tensioning foot mechanism 424 is disposed at one edge of the material 420, and pivots from an initial position 426 at an angle β onto the material 420 to exert a normal force on the edge of leaves 418, which are located on the left hand side of the material 420 (i.e., where recordation starts) such that the leaves 418 are held in place during the data obtaining process.

Further, a material registration edge device 428 provides a boundary for placement of the material 420, such that the material 420 is properly placed for recordation by the data-obtaining unit 402.

The data-obtaining unit 402 may be coupled to a data storage unit, such as an electronic memory, or a data reproduction unit such as a photocopier machine or facsimile machine (not shown).

The movable data-obtaining unit 402 is used to acquire data from material 420 and then transmit the acquired data for subsequent processing. The data-obtaining unit 402 is coupled to an associated motor (not shown) to move the data-obtaining unit across the leaf. The data-obtaining unit motor may be coupled to the microprocessor 429 such that the microprocessor 429 controls the data-obtaining unit motor.

In an alternate embodiment, the leaf turning mechanism 404 may have, or may be coupled to, a memory for storing the desired number of pages to copy. When the predetermined number of pages has been turned, the page turning mechanism 404 will terminate operation. Also, a user can enter into an associated photocopier machine, facsimile machine or other device (not shown) the number of pages to copy and the associated machine can control the leaf moving mechanism 404 to turn or flip the desired number of pages.

It will be noted that within a recordation and reproduction operation, a user may desire to record any number of leaves in a bound material that are separated by any number of intervening leaves. It will further be noted that the device of the present invention may be coupled to a microprocessor 429 with memory 431 that can be configured to allow input of the number of leaves or pages of the material from which data is to be obtained. The microprocessor 429 can calculate the pages from which data is to be obtained and the pages that are to be turned without data being obtained therefrom. A memory 431 can store the specific pages or leaves from which data is to be obtained 418(a) . . . (n), 419(a) . . . (n), and number of intervening leaves or pages, for example, 418(b) . . . (d), 419(b) . . . (d) to be turned without a data-obtaining operation. Upon the data-obtaining device 402 obtaining data from page or leaf 418(a), the leaf turning mechanism 404 will then proceed to lift and turn the intervening pages or leaves 418(b) . . . (d). After having lifted and turned the last intervening leaf to be turned 418(d), the data-obtaining device 402 will obtain data from the leaf 418(e), and the page turning mechanism 404 will continue the recordation operation with the data-obtaining unit 402 through to leaf 418(g). For example, if the user desires to copy pages 10, 20, and 30-35 in a book. The user enters the page numbers 10, 20, and 30-35, into the device, indicating page 10 is the first page from which data is to be obtained in the operation. The microprocessor 429 calculates to begin the data obtaining operation with page 10; lifts and turns, but does not obtain data from, pages 11-19; upon reaching page 20, the data obtaining unit 402 then obtains data from that page; lifts and turns, but does not record, pages 21-29; upon reaching page 30, the data obtaining unit 402 then obtains data from that page and continues to obtain data from the identified pages 30-35.

FIGS. 5A-5I show operation of the leaf moving mechanism 504 in conjunction with a data-obtaining unit 502, adapted to obtain data from leaves 518, 519 of material 520. As the leaf moving mechanism 504 lifts or acquires pages, data-obtaining unit 502 obtains data.

Figure 5A:
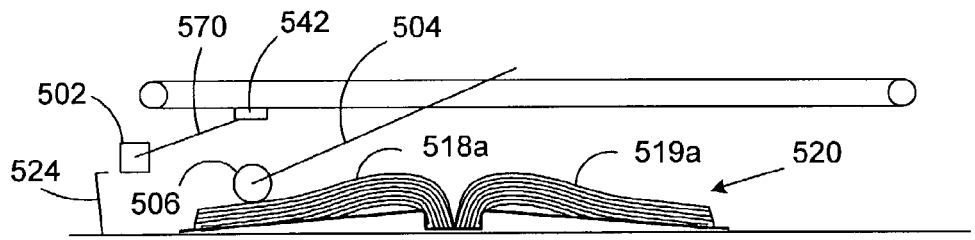
FIGS. 5A-5I show a leaf turning operation and a data recordation operation.

As shown in FIG. 5A, upon completion of the data acquisition operation on the two leaves 518(a), 519(a), the data-obtaining unit 502 is lifted by the lift and lowering mechanism 542 and returned to the rest position 570, above the material 520. The leaf moving mechanism 504 is lowered and the leaf acquiring mechanism 506 acquires leaf 518(a), then the leaf tensioning foot mechanism 524 returns to its initial position.

In an embodiment in which the leaf acquisition mechanism 506 is a vacuum roller, suction is applied to the leaf 518(a) by the vacuum roller, and the leaf 518(a) adheres to a surface of the vacuum roller. If the leaf acquisition mechanism 506 is an adhering mechanism (e.g., an adhesive applied to the roller,) the leaf 518(a) adheres to a surface of the roller.

Figure 5B:
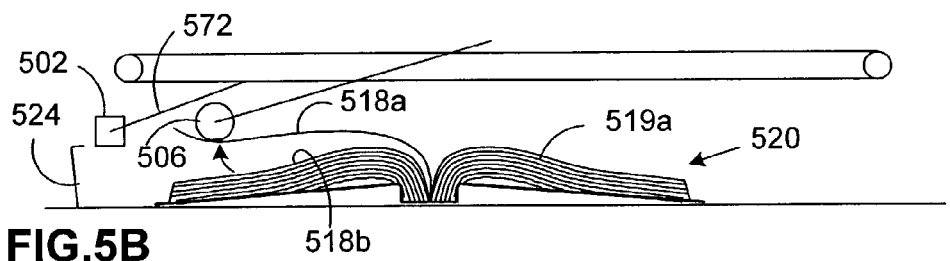

As shown in FIG. 5B, once the leaf 518(a) is acquired, the leaf acquirement mechanism 506 may move slightly to the right before lifting leaf 518(a) in order to separate the leaf 518(a) from the leaf 518(b) underneath and insure that leaf 518(b) does not lift with leaf 518(a). After the leaf acquisition mechanism 506 acquires leaf 518(a), it moves the leaf 518(a) vertically away from the underlying leaf 518(b) so that there is a sufficient space in between leaf 518(a) and 518(b) for the data-obtaining unit 502 to be placed into an initial position 572 between leaf 518(a) and 518(b) as shown below in FIG. 5C.

Figure 5C:
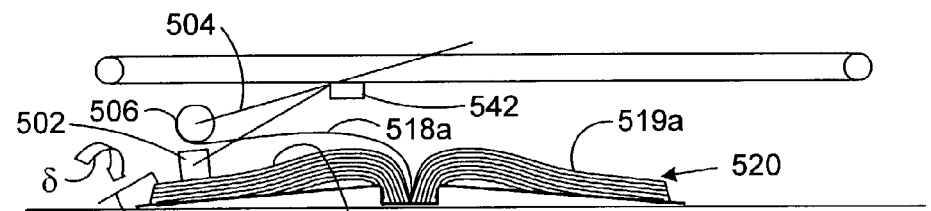

As shown in FIG. 5C, the leaf tensioning foot mechanism 524 is pivoted by an angle y onto the material 520, to exert a normal force on leaf 518(b) and the leaves underneath 518(c) . . . (n), such that the leaves are kept in tension, and drag forces exerted by the image sensor 502 during the recordation operation do not buckle the leaf 518(b). The data-obtaining unit 502 is lowered by lift and lowering mechanism 542 from initial position 572, to begin obtaining data from leaf 518(b).

Figure 5D:
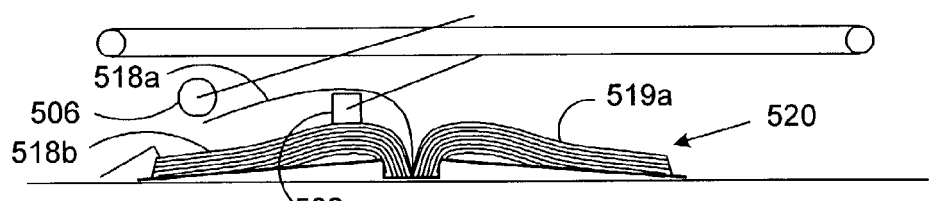

As shown in FIG. 5D, the lifted leaf 518(a) is released by the leaf acquisition mechanism 506 (e.g., by the vacuum being turned off if it is a vacuum roller), and data acquisition begins. In an embodiment in which the leaf acquisition mechanism 506 includes an adhering mechanism, the movement of the data-obtaining unit 502 across the leaf 518(b) in the scanning operation, will pull leaf 518(a) from the leaf acquisition mechanism 506 and release the leaf 518(a). Any other means to release the leaf 518(a) can also be used, such as rotating the leaf acquisition mechanism 506 such that the leaf 518(a) no longer adheres to the acquisition mechanism.

Figure 5E:
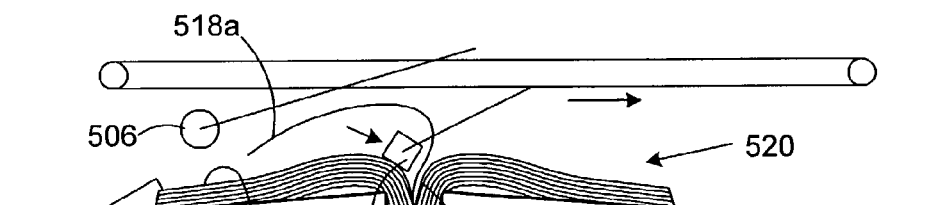
Figure 5F:
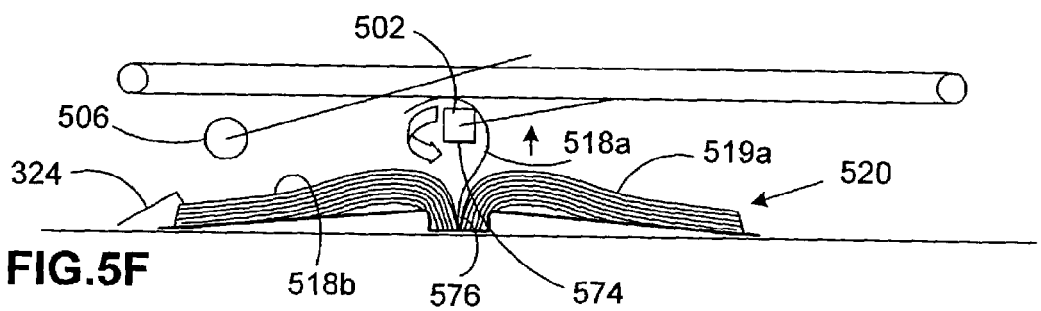

As shown in FIGS. 5E and 5F when the data-obtaining unit 502 is near a center of the material 576, the data-obtaining unit 502 is temporarily halted while the supporting arms lifts the data-obtaining unit 502 out of contact with leaf 518(b). This enables the image sensor 502 to rotate such that its imaging facet returns to an essentially horizontal position, and is facing essentially, directly downward.

When the data-obtaining unit 502 moves rightward, and then is lifted at the center of the material 576, the data-obtaining unit 502 assists in turning the lifted leaf 518(a) onto leaf 519(a).

Figure 5G:
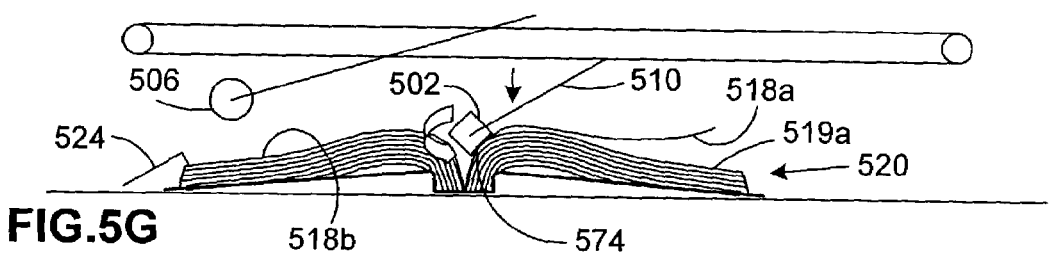

As shown in FIG. 5G, after the data-obtaining unit 502 is lifted and rotated,(The translational drive, shown as element 406 in FIG. 4 moves the data-obtaining unit slightly to the right to a position near the spine.) The supporting arm 510 then lowers the data-obtaining unit 502 back onto the underside of leaf 518(a), which is now turned and facing upward, enabling the data-obtaining unit 502 to rotate such that its imaging facet is in contact with the contour of the material 520 (i.e., on the underside of leaf 518(a)), such that the data-obtaining unit 502 can continue acquiring the data. Thus, what was the underside of the previously lifted leaf 518(a), now becomes the side of the leaf being imaged as the data-obtaining unit 502 continues its rightward scan, along the contours of the surface of the material 520. It is apparent that upon completion of the flipping or turning of the leaf 518(a), it is on the opposite side of the center of the material 576, thus it becomes one of the leaves represented by 519 in FIG. 5. It will be noted that positional language such as "upward", "underside", "right", and "left" are not intended limit the invention to those positions, and are only used as an aid in describing the embodiments herein described.

An encoding wheel (not shown), resumes sending signals to the logic circuit (not shown) to trigger the rastering of data received by the data-obtaining unit 502 as a function of linear distance moved across the curved surface of the upwardly-facing leaves 518, 519 of the material 520, thus, continuing to reduce distortion due to the contour of the surface of the leaf 518, 519.

Figure 5H:
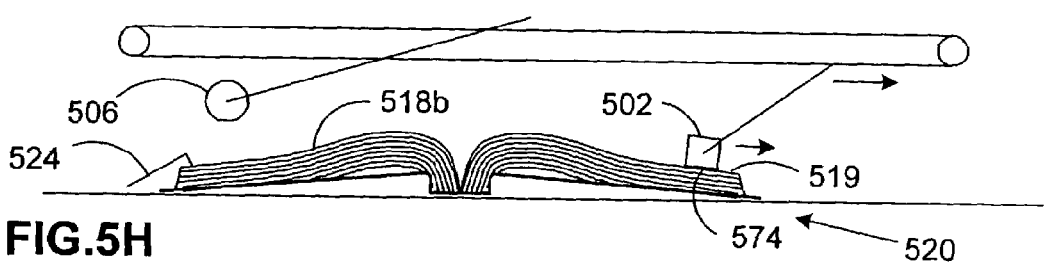

As shown in FIG. 5H the data-obtaining unit 502 continues its scanning motion, pivoting and rotating to conform to the contours and remaining tangential to the surface of the material 520, until the encoder wheel no longer receives data to trigger scanning by the data-obtaining unit at the right edge of the material 520.

Figure 5I:
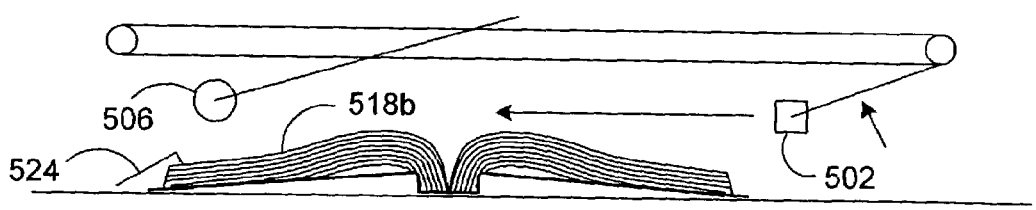

FIG. 5I shows that once data acquisition has ceased, the data-obtaining unit 502 is removed from the surface of former leaf 518(a), which is now 519 and reverses direction, to move leftward until it arrives once more in the rest position.

If leaf 518(b) is to be turned, then the process begins again, until all the leaves 518(b) . . . (n), identified by the user have been recorded for further reproduction.

It is another embodiment consistent of the present invention, that the data-obtaining unit, rather than scanning from left to right over the two upwardly facing leaves, obtains data from the material in both directions. This is accomplished by performing the steps shown in FIGS. 3A-3F in reverse sequence. The data is obtained from the leaves and temporarily stored in memory 431 of FIG. 4 for an entire leaf or pair of leaves. At the completion of scanning, the pixels are then sent to a reproducing unit in the opposite order using a pixel reordering facility.

It is another embodiment that sensor 502 is initially positioned near the spine of the material and scans to either the left or the right edge and then moves back to the initial position near the spine.

Another embodiment of the invention is one in which the leaf moving mechanism includes a leaf acquisition mechanism as described in detail in FIGS. 4 and 5 and a fixed data-obtaining unit as described in FIG. 1. In this embodiment, since the data-obtaining unit is not attached or otherwise disposed upon the support arms there is instead a leaf moving device that performs a similar page turning function as that performed by the data-obtaining unit 504 as shown in FIG. 5. Upon the completion of a leaf being moved and disposed onto a second leaf in a manner similar to that as shown herein, recordation of the newly upwardly-facing leaves is conducted by the data-obtaining unit in a manner similar to that as performed by the data-obtaining unit as shown by element 102 in FIG. 1.

Figure 6:
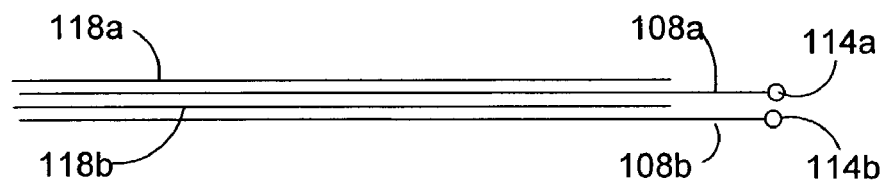
FIG. 6 shows a cross-sectional view of leaf turning sheets between pages.

FIG. 6 shows a cross-sectional view of page turning sheets 108(a) and 108(b) inserted between a corresponding page 118(a), 118(b) of material. The corresponding support arms 114(a) and 114(b) are also shown.

Figure 7:
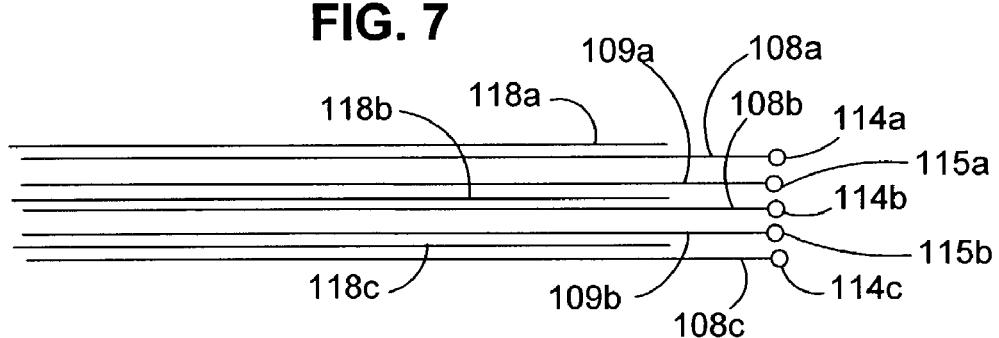
FIG. 7 shows a cross-sectional view of two leaf turning sheets between each page.

FIG. 7 shows a cross-sectional view of two page turning members used in conjunction with each other. Page turning members 108(a) and 109(a) are positioned beneath page 118(a). Member 108(a) is coupled to arm 114(a) and member 109(a) is coupled to arm 115(a). Member 108(a) is used to turn page 118(a) and member 109(a) is used to hold the underlying pages in place. Page turning members 108(b) and 109(b) are positioned beneath page 118(b). Member 108(b) is coupled to arm 114(b) and member 109(b) is coupled to arm 115(b). Page turning member 108(c) is positioned beneath page 118(c).

Figure 8:
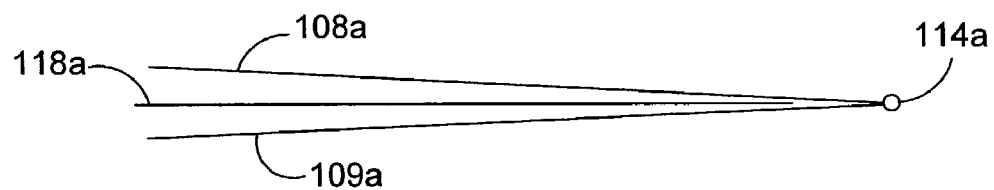
FIG. 8 shows a cross-sectional view of two leaf turning sheets surrounding a page.

FIG. 8 shows an embodiment in which members 108(a) and 109(a) envelop page 118(a). Both members 108(a) and 109(a) are connected to support arm 114(a). In this embodiment, the members 108 and 109 are moved to turn the page 118(a). Similar pairs of members are used to turn additional pages.

Figure 9:
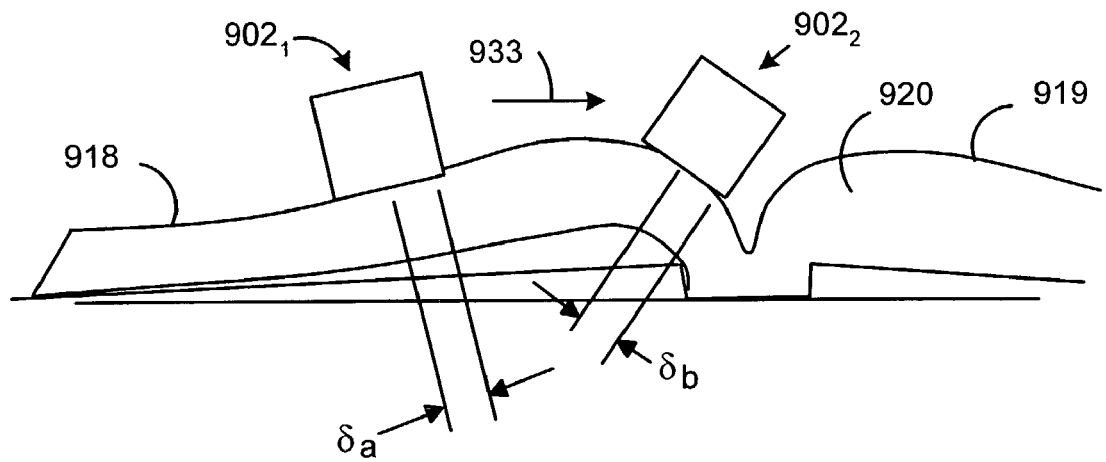
FIG. 9 shows a scanning operation according to the present invention.

FIG. 9 shows a scanning operation of the present invention. Conventional copiers and scanners distort the images taken near the spine of bound volumes because the portion of the image near the spine is often located well above the platen of the machine, which is beyond the depth of focus of the optical system. Another reason for distortion is that the curvature of the page near the spine foreshortens the image as "seen" by conventional optics. A third reason for distortion is that consistent velocity of the scanning mechanism of the optics across the entire platen area, including the images near the spine of the bound material, causes a compression of the image.

In a digitizing imaging system, lines of images are typically recorded at regular intervals across the scanned area. Typical recording intervals may range from 2400 per inch to 150 per inch. For a portion of a bound volume in intimate contact with the glass platen surface, the displacement of 1/300 inch movement of the optical scanner corresponds to 1/300 inch of image as printed on the page of the bound volume. When the image on a leaf of a volume is curved (and not in intimate contact with the platen glass), as near the spine of a bound volume, the same 1/300 inch displacement of the optical scanner corresponds to a much greater distance on the curved portion of the printed page. Thus, the image on the page appears to be foreshortened to the optics.

As shown in FIG. 9, material 920 has exposed leaves or pages 918, 919. Data obtaining unit, also referred to as a sensor, 902 is shown in two positions ($902_1$ is in the first position and $902_2$ is in the second position that is closer to the spine). The data obtaining unit is placed in direct contact with the page from which data is to be gathered (imaged). Line 933 shows the direction of travel for the sensor. At each discrete position of the sensor, an encoder signals a microprocessor, which controls the data obtaining unit to raster a line or segment of data. The data obtaining unit is triggered based on an interval of the page $\delta_a$, $\delta_b$, rather than, for example, time. The page interval $\delta$ is typically between approximately 2400 per inch and 150 per inch, or $4\times10^{-4}$ and $7\times10^{-3}$ inches. This results in a reduction of the focusing distortion. As described above, the image rastering intervals $\delta$ are established spatially by a roller in contact with the page being imaged, and an encoder wheel associated with the roller, such that lines of image data are rastered out of the data obtaining unit at intervals determined by the displacement of the image sensor measured spatially along the curved surface of the page being imaged.

Figure 10:
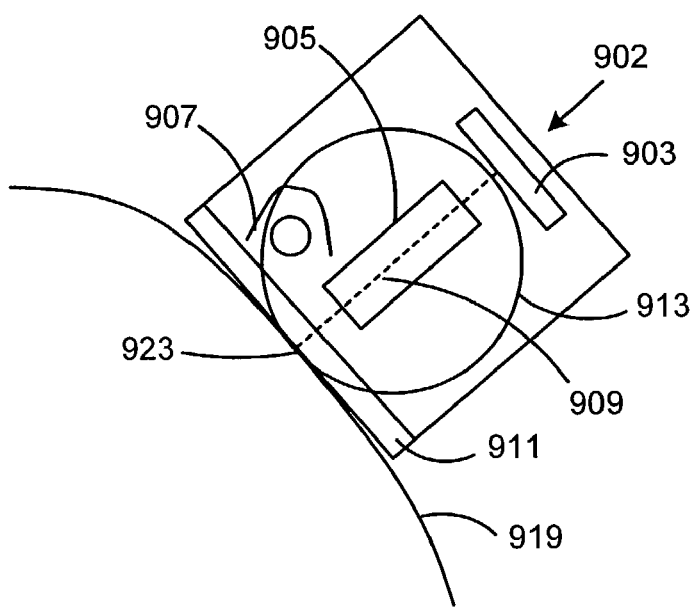
FIG. 10 shows a data obtaining unit.

FIG. 10 shows some of the components of data obtaining unit 902. These components include a linear array of imaging chips with photodetector elements and electronics 903 to raster lines of images, a lens 905, and illuminator, such as LED chips, 907, imaging optical ray 909, glass surface 911 and a roller 913. The data obtaining unit 902 is in contact with a portion of a page at point 923. The optical ray 909 is essentially perpendicular to the page and the data obtaining unit is in contact with a surface that is not necessarily flat.

Thus, the data obtaining unit 902 rotates to conform to the undulation of the book or material and follow the profile of the curved surfaces of the pages of the bound material such that the imaging optics remain essentially perpendicular to the page being imaged, and in intimate contact with the page so that the image remains within the depth of focus of the optics.

While methods and apparatus consistent with the present invention have been particularly shown with reference to the above embodiments, it will be understood by those skilled in the art that various other changes in the form and details may be made therein without departing from the spirit and the scope of the invention.

What is claimed is:

1. An apparatus adapted to turn leaves of a material and obtain data from an exposed leaf comprising:
    a leaf acquisition mechanism adapted to contact at least a portion of a leaf and lift the leaf so as to turn the leaf;
    a support frame adapted to support the leaf acquisition mechanism;
    a plurality of support members adapted to connect the leaf acquisition mechanism to the support frame;
    a drive unit adapted to control the leaf acquisition mechanism;
    a data obtaining unit adapted to obtain data from the leaf by moving so as to traverse a leaf exposed by the operation of the leaf acquisition mechanism, wherein the data obtaining unit pivots to maintain a desired angle with respect to the material;
    a wheel unit adapted to establish displacement of the data obtaining unit from an initial position;
    a leaf tensioning mechanism adapted to exert a stabilizing force on the material; and
    a medium for displaying the obtained data.

2. The apparatus according to claim 1 where the leaf acquisition mechanism is a vacuum mechanism.

3. The apparatus according to claim 1 where the leaf acquisition mechanism is an adhering mechanism.

4. The apparatus according to claim 1, wherein the data obtaining unit is a camera.

5. The apparatus according to claim 1, wherein, after the data is obtained, the data is reproduced on a medium.

6. The apparatus according to claim 1, wherein, after the data is obtained, the data is reproduced on a film.

7. The apparatus according to claim 1, wherein, the data is stored digitally.

8. An apparatus adapted to turn leaves of a material having a plurality of leaves, comprising:
    a leaf moving mechanism, adapted to contact a portion of a leaf;
    a leaf moving frame, connected to the leaf moving mechanism, adapted to support the leaf moving mechanism;
    a drive unit adapted to move the leaf moving frame from a first position to a second position, the first position being different from the second position; and
    a data obtaining unit, adapted to operate in conjunction with the leaf moving mechanism to facilitate turning a leaf of the material and obtain data from an exposed leaf of the material, wherein the data obtaining unit comprises:
    at least one supporting arm having a proximal portion and a distal portion; and
    an image sensor mounted on the distal portion of the supporting arm;
    wherein the image sensor is adapted to traverse a surface of the exposed leaf to obtain data from the exposed leaf of the material.

9. The apparatus as claimed in claim 8, wherein a surface of the data obtaining unit is in essentially tangential contact with a surface of the leaf.

10. The apparatus as claimed in claim 8, wherein the data-obtaining unit is mounted in proximity to the material and stores data obtained from the material.

11. The apparatus according to claim 10, wherein the data obtaining unit includes a facsimile machine.

12. The apparatus according to claim 10, wherein the data obtaining unit includes a printer.

13. The apparatus according to claim 10, wherein the data-obtaining unit includes a photocopier.

14. The apparatus according to claim 10, wherein the data obtaining unit includes a memory.

15. The apparatus according to claim 8, wherein the data obtaining unit further comprises a reordering unit adapted to scan the data on the leaves of the material in a plurality of orientations.

16. The apparatus according to claim 15, wherein the reordering unit comprises a memory.

17. The apparatus according to claim 15, wherein the reordering unit reorders pixels scanned from a leaf.

18. The apparatus according to claim 15, wherein the reordering unit is controlled by an algorithm.

19. The apparatus according to claim 8, further comprising a lift and lowering mechanism, and
    wherein the lift and lowering mechanism lifts the supporting arm when the image sensor is near a center position between two exposed leaves of the material after obtaining data on the first leaf and after being lifted, the image sensor is rotated a first angle.

20. The apparatus according to claim 19, wherein the lift and lowering mechanism of the first support mechanism lowers the supporting arm such that upon contact with a second leaf, the image sensor rotates a second angle.

21. The apparatus according to claim 20, wherein upon completion of obtaining from the leaves of the material, the supporting arm is lifted and the image sensor is returned to a rest position.

22. The apparatus according to claim 8, wherein the data obtaining unit further comprises an encoder wheel attached to a roller, the roller being disposed at a first portion of an image sensor and determines a distance traveled by the image sensor on the material.

23. The apparatus according to claim 22, wherein the leaf moving mechanism further comprises:
    a carriage transport drive unit; and
    a pivoting mechanism disposed on the carriage transport drive adapted to pivot the supporting arm.

24. The apparatus according to claim 8, wherein the leaf moving mechanism is an adhering mechanism.

25. The apparatus according to claim 8, wherein the leaf moving mechanism acquires and lifts a first leaf of exposed leaves of the material such that the image sensor is moved by the at least one supporting arm to be positioned at an initial position to begin obtaining data.

26. The apparatus according to claim 25, wherein after the first leaf is lifted by the leaf moving mechanism, the leaf moving mechanism releases the first leaf.

27. The apparatus according to claim 8, wherein the motion of the image sensor on the supporting arm assists in turning a first leaf from which data was previously obtained.

28. The apparatus according to claim 27, wherein after being lifted near a center position between the leaves of the material and the first leaf is turned by movement of the image sensor on the supporting arm, the supporting arm is lowered by the lift and lowering mechanism onto an underside of the first leaf of the material to continue obtaining the data of the underside of the first leaf of the material.

29. The apparatus according to claim 8, further comprising a leaf tensioning foot mechanism adapted to pivot and to exert a normal force on one of two upwardly-facing leaves of the material.

30. The apparatus according to claim 8, further comprising a material registration edge device adapted to provide a boundary for an edge of the material.

31. The apparatus according to claim 8, wherein the leaf moving mechanism is a vacuum mechanism.

* * * * *